(12) United States Patent
Zones et al.

(10) Patent No.: US 8,545,805 B2
(45) Date of Patent: Oct. 1, 2013

(54) METHOD FOR PREPARING SMALL CRYSTAL SSZ-32

(75) Inventors: Stacey I. Zones, San Francisco, CA (US); Bowman Lee, Albany, CA (US); Lun-Teh Yuen, San Francisco, CA (US); Tracy M. Davis, Pinole, CA (US); James N. Ziemer, Martinez, CA (US); Adeola Ojo, Pleasant Hill, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 103 days.

(21) Appl. No.: 12/940,776

(22) Filed: Nov. 5, 2010

(65) Prior Publication Data
US 2012/0114553 A1 May 10, 2012

(51) Int. Cl.
*C01B 39/04* (2006.01)

(52) U.S. Cl.
USPC .......................................................... 423/706

(58) Field of Classification Search
USPC ................................................ 423/700–718
See application file for complete search history.

(56) References Cited

U.S. PATENT DOCUMENTS

| | | |
|---|---|---|
| 3,140,249 A | 7/1964 | Plank et al. |
| 3,140,251 A | 7/1964 | Plank et al. |
| 3,140,253 A | 7/1964 | Plank et al. |
| 4,094,821 A | 6/1978 | McVicker et al. |
| 4,849,194 A * | 7/1989 | Krishnamurthy et al. .... 423/700 |
| 4,935,215 A | 6/1990 | Krishnamurthy |
| 5,053,373 A | 10/1991 | Zones |
| 5,252,527 A | 10/1993 | Zones |
| 5,707,601 A | 1/1998 | Nakagawa |
| 7,390,763 B2 | 6/2008 | Zones et al. |
| 7,468,126 B2 * | 12/2008 | Zones et al. ................. 208/26 |
| 7,569,507 B2 | 8/2009 | Zones et al. |
| 2007/0041898 A1 | 2/2007 | Zones et al. |
| 2010/0116034 A1 | 5/2010 | Abbott et al. |
| 2010/0121583 A1 | 5/2010 | Abbott et al. |

FOREIGN PATENT DOCUMENTS

EP 0522196 1/1993

OTHER PUBLICATIONS

J. L. Casci and B.M. Lowe, "Use of pH-measurements to monitor zeolite crystallization," Zeolites, 3, 186-187,(1983).
B. M. Lowe, "An equilibrium model for the crystallization of high silica zeolites," Zeolites, 3, 300-305, (1983).
S.I. Zones, "Synthesis of pentasil zeolites from sodium silicate solutions in the presence of quaternary imidazole compounds," Zeolites, 9, 458-467,(1989).
S.I. Zones and S-J Hwang, "The inorganic chemistry of guest-mediated zeolite crystallization: a comparison of the use of boron and aluminum as lattice-substituting components in the presence of a single guest molecule during zeolite synthesis," Microporous Mesoporous Mater., 58, 263-277, (2003).
A.W. Burton, K. Ong, T. Rea, and I.Y. Chan, "On the estimation of average crystallite size of zeolites from the Scherrer equation: A critical evaluation of its application to zeolites with one-dimensional pore systems," Microporous Mesoporous Mater., 117, 75-90, (2009).

(Continued)

*Primary Examiner* — Melvin C Mayes
*Assistant Examiner* — Stefanie Cohen
(74) *Attorney, Agent, or Firm* — Terrence Flaherty; E. Joseph Gess

(57) ABSTRACT

The invention is directed to a method for making small crystal zeolites, such as small crystal SSZ-32, in the absence of an amine component.

13 Claims, 2 Drawing Sheets

(56) References Cited

OTHER PUBLICATIONS

L.R.A. Follens, E.K. Reichel, C. Riesch, J. Vermant, J.A. Martens, C.E.A. Kirschhock, and B. Jakoby, "Viscosity Sensing in Heated Alkaline Zeolite Synthesis Media," Phys. Chem. Chem. Phys.,11, 2854-2857, (2009).

PCT International Search Report, PCT/US2011/057225, mailed May 1, 2012.

* cited by examiner

METHOD FOR PREPARING SMALL CRYSTAL SSZ-32

TECHNICAL FIELD

The invention relates generally to a method of making a catalyst comprising a small crystal intermediate pore size zeolite, specifically SSZ-32.

BACKGROUND

Small crystal SSZ-32 (hereinafter referred to as SSZ-32X), in comparison with standard SSZ-32, possesses less defined crystallinity, altered Argon adsorption ratios, increased external surface area and reduced cracking activity over other intermediate pore size molecular sieves used for a variety of catalytic processes. SSZ-32X and methods for making it are disclosed in U.S. Pat. Nos. 7,390,763 and 7,569,507. Both methods require the combination of an imidazolium cation and an amine component as templates.

There is a need for improved methods for preparing SSZ-32X.

SUMMARY OF THE INVENTION

In one aspect, the invention relates to a method for making a small crystal zeolite, comprising preparing a reaction mixture comprising: at least one active source of an oxide of silicon, at least one active source of an oxide of aluminum, at least one active source of an alkali metal, hydroxide ions, and a organic templating agent having the structure:

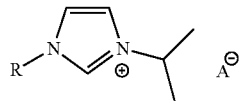

wherein R is a $C_1$ to $C_5$ alkyl group and $A^-$ is an anion which is not detrimental to the crystallization of the zeolite; and maintaining the reaction mixture under conditions sufficient to form crystals of the zeolite wherein the zeolite is prepared in the absence of an amine component.

DETAILED DESCRIPTION

Figure 1:
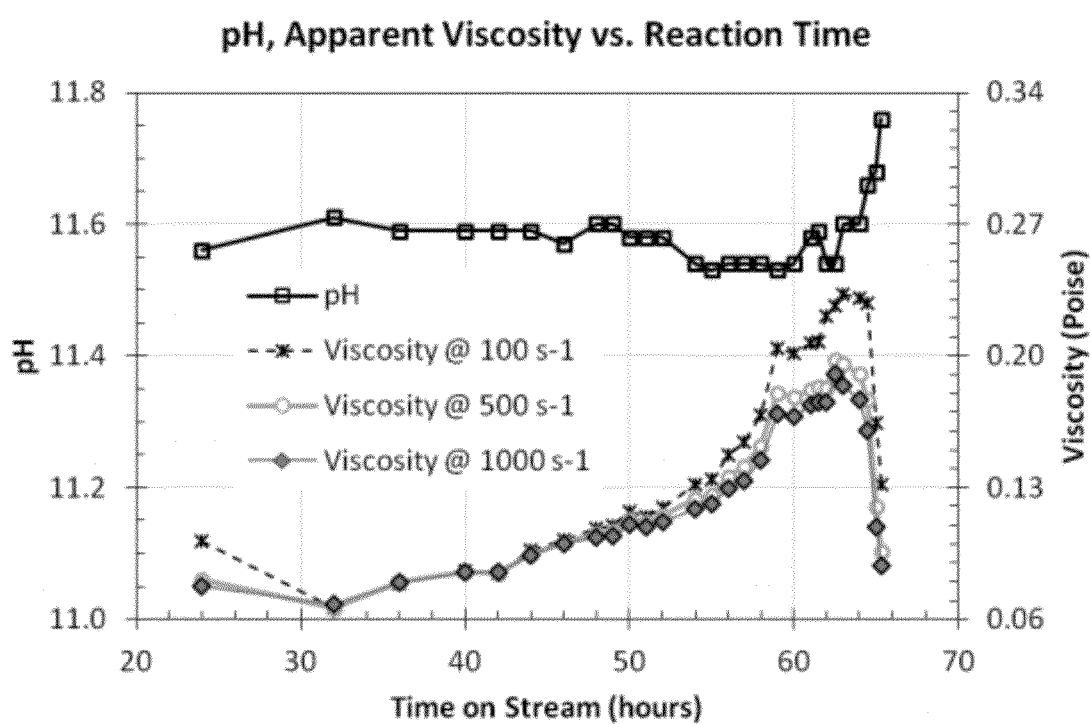
FIG. 1 illustrates changes in apparent viscosity and pH of slurry samples at various shear rates taken from the autoclave during a zeolite synthesis.

The following terms will be used throughout the specification and will have the following meanings unless otherwise indicated.

The term "small crystal zeolite" refers to zeolites having a crystallite size of no more than 100 nanometers.

The term "crystallite size" refers to the longest dimension of the crystal. The crystallite, size of the zeolite may be determined by, for example, grinding the shaped particles to separate the individual crystals. High resolution electron micrographs of the separated crystals can then be prepared, after which the average size of individual zeolite crystals can be determined by reference to calibrated length standards. An average crystallite size may then be computed in various well-known ways. It is important to note that for purposes of this invention, zeolite crystallite size is distinguished from what some manufacturers term "zeolite particle size," the latter being the average size of all particles, including both individual crystals and polycrystalline agglomerates, in the as-produced zeolite powder.

The term "active source" refers to a reagent or precursor material capable of supplying an element in a form that can react and be incorporated into the target zeolite structure. The term "source" and "active source" are used interchangeably herein.

The term "reaction time" refers to the elapsed time from a point when the reaction mixture has attained the designated or target reaction temperature; for example, for a reaction mixture having an eight-hour ramp from ambient to reaction temperature, the end of the eight-hour ramp period represents reaction time zero. The terms "reaction time" and "time on stream" may be used herein interchangeably and synonymously.

The term "measured viscosity" refers to a value for the viscosity of a fluid such as a reaction mixture for zeolite synthesis as recorded, determined or measured, for example, using an instrument such as a rheometer. The measured viscosity of a sample removed from the reaction mixture at a given time point may be different from the actual viscosity of the reaction mixture in situ at that time point due, for example, to differences in the dynamics of crystallite aggregation and disaggregation in a reactor and in a sample removed from the reactor. Nonetheless, changes over time of measured viscosity of samples of the reaction mixture have been found by the applicant to have predictive value in determining the endpoint of the zeolite synthesis. The terms "measured viscosity" and "apparent viscosity" may be used herein interchangeably and synonymously.

The term "endpoint" refers to the stage of the reaction or process when the target product has been formed and has attained at least one desired product characteristic or attribute, for example, in terms of crystal size, physical properties, catalytic activity, yield, and the like. For a given product and synthesis process, the endpoint may vary depending on the desired product attribute(s) in relation to the intended use(s) for the product.

Zeolite Synthesis

SSZ-32X zeolites can be suitably prepared, in the absence of an amine component, from an aqueous solution containing sources of an alkali metal oxide or hydroxide, an imidazolium cation which is subsequently ion-exchanged to the hydroxide form, an oxide of aluminum (preferably wherein the aluminum oxide source provides aluminum oxide which is covalently dispersed on silica), and an oxide of silicon. The reaction mixture should have a composition in terms of molar ratios falling within the following ranges:

TABLE 1

|  | Broad | More Typically |
|---|---|---|
| $SiO_2/Al_2O_3$ | 20 < 72 | 30-35 |
| $H_2O/SiO_2$ | 5-100 | 15-35 |
| $OH^-/SiO_2$ | 0.07-1.0 | 0.15-0.4 |
| $M/SiO_2$ | 0.02-0.5 | 0.1-0.3 |
| $Q/SiO_2$ | 0.02-0.5 | 0.02-0.25 |

In one embodiment, the reaction mixture has a $SiO_2/Al_2O_3$ molar ratio of 20 to less than 40.

The reaction mixture is prepared using standard zeolitic preparation techniques. Typical sources of silicon dioxide include fumed silica, precipitated silicates, silica hydrogel, silicic acid, colloidal silica, tetraalkyl orthosilicates, and silica hydroxides. Typical sources of aluminum oxide include aluminates, alumina, and aluminum compounds such as aluminum-coated silica colloids, $AlCl_3$, $Al_2(SO_4)_3$, $Al(OH)_3$, kaolin clays, and other zeolites, such as mordenite and ferrierite zeolites.

In one embodiment, the at least one active source of an oxide of silicon and the at least one active source of an oxide of aluminum are derived from a common source. An exemplary common source is an alumina-coated silica sol, such as 1SJ612, which is available commercially from Nalco (Naperville, Ill.). In another approach, zeolites of pentasil structure and lower silica/alumina ratios (approximately 10) can be used as feedstocks for the synthesis of zeolite SSZ-32X. An advantage of employing a common source for the alumina and silica is the elimination of the gel formation step, wherein the sources of silicon and aluminum are stirred until a homogeneous mixture is obtained, which consequently reduces zeolite preparation time.

Generally, the at least one active source of an oxide of silicon, the at least one active source of an oxide of aluminum, the at least one active source of an alkali metal, hydroxide ions and the organic templating agent are added to deionized water to form the reaction mixture. In one embodiment, the components are mixed in the absence of deionized water solvent to provide a more concentrated reaction mixture. In one embodiment, the reaction mixture has a $H_2O/SiO_2$ molar ratio of from 15 to 20.

M is an alkali metal cation, preferably sodium or potassium. Any alkali metal-containing compound which is not detrimental to the crystallization process is suitable. Sources for the alkali metal ions include alkali metal oxides, hydroxides, nitrates, sulfates, halogenides, oxalates, citrates and acetates. The organic templating agent (O) which acts as a source of the quaternary ammonium-ion employed can provide hydroxide ion.

Q is an organic templating agent having the structure

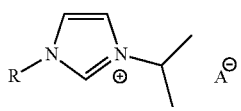

wherein R is a $C_1$ to $C_5$ alkyl group and $A^-$ is an anion that is not detrimental to the formation of the zeolite. Examples of $C_1$ to $C_5$ alkyl groups include methyl, ethyl, n-propyl, isopropyl, n-butyl, isobutyl, tert-butyl, n-pentyl, isopentyl and neopentyl. In one embodiment, R is methyl; in another embodiment, R is isopropyl. Representative examples of anions include hydroxide, acetate, sulfate, carboxylate and halogens, for example, fluoride, chloride, bromide and iodide. In one embodiment, the anion is hydroxide. U.S. Pat. Nos. 5,053,373 and 5,252,527 disclose a zeolite such as SSZ-32 which is prepared using an imidazolium cation as an organic templating agent.

Salts, particularly alkali metal halides such as sodium chloride, can be added to or formed in the reaction mixture. They are disclosed in the literature as aiding the crystallization of zeolites while preventing silica occlusion in the lattice.

The reaction mixture is maintained at an elevated temperature until the crystals of the zeolite are formed. The temperatures during the hydrothermal crystallization step are generally maintained from 140° C. to 200° C., more typically from 160° C. to 190° C., and often from 170° C. to 180° C. In one embodiment, the conditions sufficient to form crystals of the zeolite comprises heating the reaction mixture at a first temperature of from 175° C. to 190° C. for a period of from 12 to 48 hours; and reducing the first temperature of the reaction mixture to a second temperature of from 140° C. to 170° C. for a suitable period of time to form crystals of the zeolite. The crystallization period is generally greater than 1 day and more typically from 2 days to 10 days.

The hydrothermal crystallization is conducted under pressure and usually in an autoclave so that the reaction mixture is subject to autogenous pressure. The reaction mixture can be stirred while components are added as well as during crystallization. During the hydrothermal crystallization step, the crystals can be allowed to nucleate spontaneously from the reaction mixture. The reaction mixture can also be seeded with SSZ-32X crystals both to direct, and to accelerate the crystallization, as well as to minimize the formation of undesired aluminosilicate contaminants. In one embodiment, seeds are present in the reaction mixture in an amount of 0.5 to 10 wt. % wherein the weight percent (wt. %) of the seed is based on the weight percent of $SiO_2$; in another embodiment, seeds are present in an amount of 1 to 5 wt. %.

In one embodiment, the method of making a small crystal zeolite further comprises monitoring at least one viscometric parameter of the reaction mixture and determining an endpoint of the zeolite synthesis process. During the reaction, the extent of crystallization may be monitored by measuring, at various time points, at least one viscometric parameter of the reaction mixture. It has been found that during crystallization, certain bulk properties of the reaction mixture vary concurrently with the progression of the synthesis process, thereby permitting the measurement of the reaction mixture bulk properties to form a basis for determining the status of one or more properties of the zeolite. Such properties may include the crystallization status of the reaction mixture (crystallite size, degree of crystallite agglomeration) as well as the quantitative product yield, and characteristics related to the catalytic activity of the zeolite.

In one embodiment, the monitoring step comprises periodically removing a sample of the reaction mixture, cooling each sample to a pre-defined temperature, and measuring the at least one viscosity parameter of each sample. The frequency at which the reaction mixture is sampled may be hourly or at a greater or lesser frequency. For example, samples may be withdrawn from the reactor at a frequency of once every 10 minutes to 120 minutes, and typically once every 15 minutes to 60 minutes. The cooling of each sample to a pre-defined temperature may be generally in the range from 5° C. to 50° C., typically from 10° C. to 30° C., and often from 15° C. to 25° C. Generally, the viscometric parameter of each sample is measured within ±0.2° C. of the p' re-defined temperature, typically within ±0.1° C., and often within ±0.05° C. of the pre-defined temperature. Thereafter, an endpoint of the molecular sieve synthesis process may be determined based, for example, on a change in the at least one viscosity parameter of the reaction mixture.

In one embodiment, the at least one viscometric parameter of the reaction mixture is selected from the group consisting of viscosity shear rate index, measured viscosity, or combination thereof.

The viscosity shear rate index of each sample of the reaction mixture can be quantified or determined by subjecting the sample to a plurality of shear rates at the pre-defined temperature, and recording a shear stress value corresponding to each of the plurality of shear rates to provide a plurality of shear stress values. Typically, each of the plurality of shear rates may be within the range from 100 $s^{-1}$ to 1000 $s^{-1}$. Thereafter, the viscosity shear rate index (η) for the sample can be determined based on the plurality of shear rates and the corresponding plurality of shear stress values, wherein the relationship between shear rate ($\gamma$) and shear stress ($\sigma$) is given by: $\sigma \propto \gamma^\eta$. As an example, the viscosity shear rate index ($\eta$) can be determined by fitting a straight line to a plot of the natural log of the shear stress values (ln($\sigma$), Pascals; y-axis) versus the natural log of the shear rate values (ln($\gamma$), s$^{-1}$; x-axis). Using this model, Newtonian fluids have $\eta=1$, whereas fluids (reaction mix slurries) with weakly agglomerated crystallites, will typically exhibit pseudo-plastic (or shear-thinning) behavior with $\eta<1$. In general, the smaller the viscosity shear rate index of a slurry, the greater its degree of pseudo-plasticity.

The measured viscosity can be determined for each of a plurality of samples of the reaction mixture taken at a plurality of points in time during the zeolite synthesis process. The measured viscosity of each sample may be determined via a rheometer by subjecting the sample to at least one shear rate at the pre-defined temperature, and recording at least one shear stress corresponding to the at least one shear rate. Thereafter, the measured viscosity ($\mu$) of the sample may be determined by dividing the shear stress ($\sigma$) by the corresponding shear rate ($\gamma$), namely, $\mu=\sigma/\gamma$. Typically, the at least one shear rate to which the sample is subjected may be in the range from 100 s$^{-1}$ to 1000 s$^{-1}$.

The pH of the reaction mixture may also be monitored during crystallization, for example, to provide supplemental data for determining or confirming the status of one or more properties of the zeolite. The use of pH measurements to monitor crystallization is known in the art. See, for example, J. L. Casci et al., *Zeolites*, 3, 186-187 (1983); B. M. Lowe, *Zeolites*, 3, 300-305 (1983); S. I. Zones, *Zeolites*, 9, 458-467 (1989); and S. I. Zones et al., *Microporous Mesoporous Mater.*, 58, 263-277 (2003). One advantage of the method of the present invention is that zeolites are prepared in the absence of an amine component. Previously disclosed methods required the presence an amine component which may act as a potential buffer. Removal of the amine component permits the changes associated with crystallization to be better followed by pH, thereby allowing the reaction to be quenched with greater accuracy.

Accordingly, various properties of the reaction mixture, such as viscometric parameters, may be used to monitor the progress of crystallization of the target zeolite and to determine or predict the reaction endpoint. The endpoint of the synthesis process may be determined based on a change in measured viscosity of the reaction mixture, a change in pH of the reaction mixture, or combination thereof. FIG. 1 illustrates the changes in apparent viscosity and pH of slurry samples as an SSZ-32X crystallization progresses to an endpoint of about 65 hours. Moreover, monitoring the progress of crystallization allows for obtaining higher yields of zeolites of the desired crystallite size and less of undesirable crystallite sizes (either under-crystallized or over-crystallized products).

Accordingly, during synthesis at least one property of the zeolite, for example, crystal size or yield, is estimated by comparing one or more values of a measured parameter of the reaction mixture with data from a predetermined relationship between the zeolite property and the measured property. The predetermined relationship between the zeolite property and the measured property is derived from one or more previous synthesis processes, for example, using the same or substantially the same equipment, and the same or substantially the same reaction mixture and conditions, during which at least one measured property and at least one of the properties of the sieve were correlated as a function of time. Thus, once the system has been calibrated by correlating measured reaction mixture properties with observed zeolite properties, the measured reaction mixture properties may serve as a basis for determining the progress of the reaction, with respect to one or more properties of the zeolite, during subsequent syntheses.

Once the desired zeolite crystals have formed, the solid product is separated from the reaction mixture by standard mechanical separation techniques such as filtration or centrifugation. The crystals are water-washed and then dried, for example, at 90° C. to 150° C. for from 8 to 24 hours, to obtain the as-synthesized, zeolite crystals. The drying step can be performed at, or below, atmospheric pressure.

In one embodiment, the zeolite of the invention has a crystallite size of 10 to 40 nanometers; in another embodiment, a crystallite size of 12 to 20 nanometers.

In one embodiment, the zeolite of the invention has, in its as-synthesized form, a silica to alumina molar ratio of 20 to less than 72; in another embodiment, a silica to alumina molar ratio of 20 to less than 40.

Figure 2:
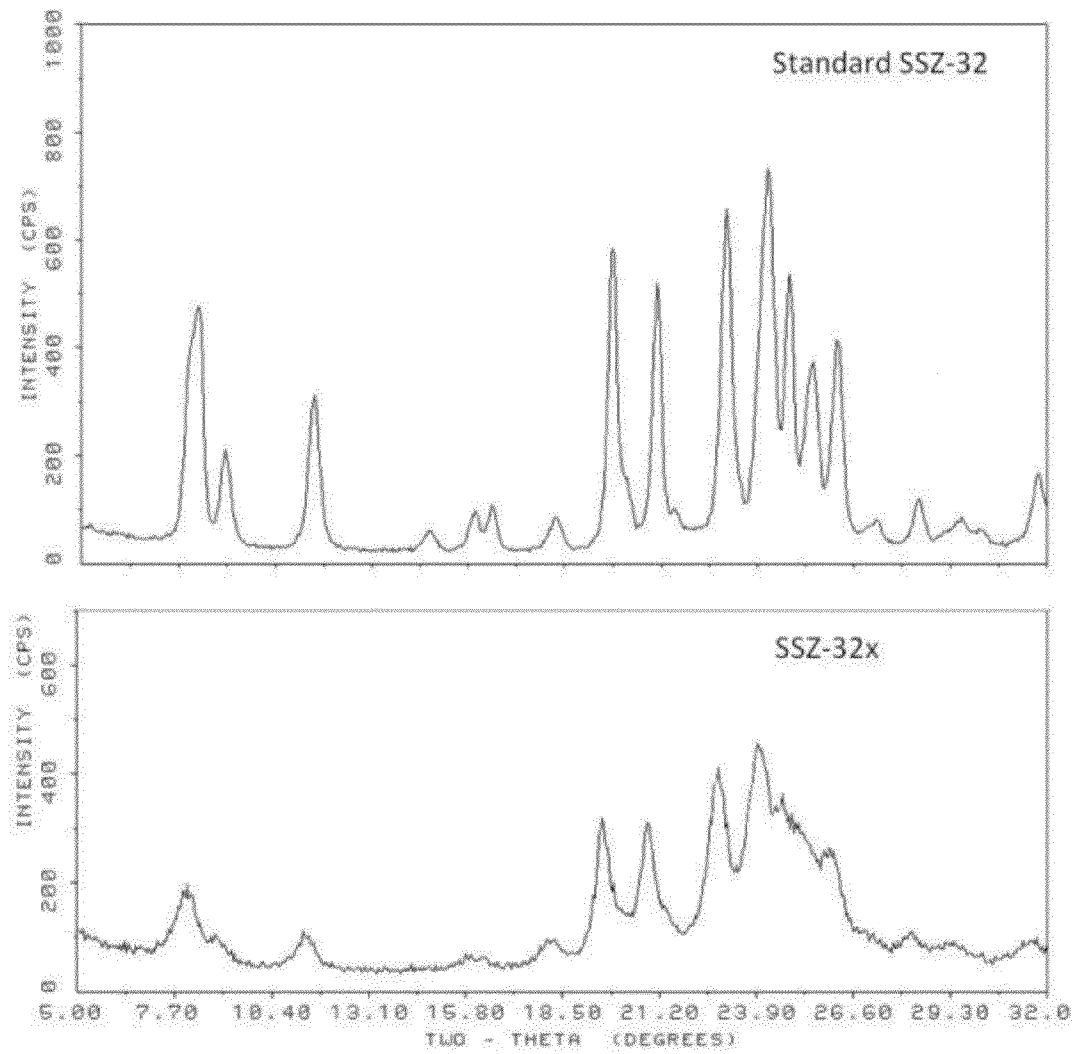
FIG. 2 provides a comparison between the powder X-ray diffraction (XRD) patterns of standard SSZ-32 and SSZ-32X.

Standard SSZ-32 and SSZ-32X have the framework topology designated "MTT" by the International Zeolite Association. SSZ-32X zeolites synthesized according to the present invention may be characterized by their X-ray diffraction (XRD) pattern. Standard SSZ-32 and SSZ-32X may be distinguished by XRD because the XRD pattern broadens as the crystallites are reduced in size. FIG. 2 compares the SSZ-32X peak occurrence and relative intensity with that of standard SSZ-32. The powder XRD lines of Table 2 are representative of calcined standard SSZ-32. The powder XRD lines of Table 3 are representative of calcined SSZ-32X made in accordance with this invention.

TABLE 2

Characteristic XRD Peaks for Calcined Standard SSZ-32

| 2-Theta[a] (Degrees) | d-spacing (Angstroms) | Relative Absolute Intensity (%)[b] |
|---|---|---|
| 7.90[c] | 11.18 | VS |
| 8.12[c] | 10.88 | VS |
| 8.86 | 9.97 | M |
| 11.38 | 7.76 | S |
| 14.60 | 6.06 | W |
| 15.86 | 5.58 | W |
| 16.32 | 5.43 | W |
| 18.12 | 4.89 | W |
| 19.72 | 4.50 | VS |
| 20.96 | 4.24 | VS |
| 22.86 | 3.89 | VS |
| 24.02 | 3.70 | VS |
| 24.62 | 3.61 | S-VS |
| 25.28 | 3.52 | M |
| 25.98 | 3.43 | S |
| 28.26 | 3.16 | W |
| 31.60 | 2.83 | W |
| 35.52 | 2.52 | S |

[a] ±0.20

[b] The powder XRD patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

[c] These peaks may have significant overlap and are sometimes treated as a single peak.

TABLE 3

Characteristic XRD Peaks for Calcined SSZ-32X

| 2-Theta[a] (Degrees) | d-spacing (Angstroms) | Relative Absolute Intensity (%)[b] |
|---|---|---|
| 8.1 | 10.88 | M |
| 8.9 | 9.88 | W |
| 11.4 | 7.78 | M |
| 16.1 | 5.51 | W |
| 19.8 | 4.49 | VS |
| 21.0 | 4.22 | VS |
| 23.0 | 3.86 | VS |
| 24.2 | 3.67 | VS |
| 25.4 | 3.50 | S |
| 26.1 | 3.41 | S |
| 31.6 | 2.83 | W |
| 35.6 | 2.52 | M |
| 36.7 | 2.45 | W |
| 44.8 | 2.02 | W |

[a]±0.20
[b]The powder XRD patterns provided are based on a relative intensity scale in which the strongest line in the X-ray pattern is assigned a value of 100: W (weak) is less than 20; M (medium) is between 20 and 40; S (strong) is between 40 and 60; VS (very strong) is greater than 60.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic templating agent used in the preparation and from variations in the Si/Al molar ratio of various preparations. Calcination can also cause minor shifts in the XRD pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ where θ is the Bragg angle, were read from the relative intensities of the peaks (adjusting for background), and d, the interplanar spacing in Angstroms corresponding to the recorded lines, can be calculated.

SSZ-32X can be used as-synthesized or can be thermally treated (calcined). Usually, it is desirable to remove the alkali metal cation by ion exchange and replace it with hydrogen, ammonium, or any desired metal ion. The zeolite can be leached with chelating agents, for example, EDTA or dilute acid solutions, to increase the silica alumina mole ratio. SSZ-32X can also be steamed. Steaming helps stabilize the crystalline lattice to attack from acids.

The zeolite can also be impregnated with the metals, or, the metals can be physically intimately admixed with SSZ-32X using standard methods known to the art. And, the metals can be occluded in the crystal lattice by having the desired metals present as ions in the reaction mixture from which the SSZ-32X zeolite is prepared.

Typical ion exchange techniques involve contacting the SSZ-32X with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after SSZ-32X is calcined.

Following contact with the salt solution of the desired replacing cation, SSZ-32X is typically washed with water and dried at temperatures ranging from 65° C. to 315° C. After washing, SSZ-32X can be calcined in air or inert gas at temperatures ranging from 200° C. to 820° C. for periods of time ranging from 1 to 48 hours, or more, to produce a catalytically active product especially useful in hydrocarbon conversion processes.

The SSZ-32X zeolite described above may be converted to its acidic form and then may be mixed with a refractory inorganic oxide carrier precursor and an aqueous solution to form a mixture. The aqueous solution is preferably acidic. The solution acts as a peptizing agent. The carrier (also known as a matrix or binder) may be chosen for being resistant to the temperatures and other conditions employed in organic conversion processes. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic SSZ-32X, that is, combined with it, tends to improve the conversion and selectivity of the catalyst in certain organic conversion processes.

SSZ-32X may be commonly composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a co-gel. The preferred matrix materials are alumina and silica. It is possible to add metals for the enhancement of catalytic performance, during the actual synthesis of SSZ-32X, as well as during later steps in catalyst preparation. Methods of preparation include solid state ion exchange which is achieved by thermal means, spray drying with a metal salt solution, and preparation of a slurry in a salt solution. The slurry may be filtered to retrieve the SSZ-32X, now loaded with metal.

Inactive materials can suitably serve as diluents to control the amount of conversion in a given process so that products can be obtained economically without using other means for controlling the rate of reaction. Frequently, zeolite materials have been incorporated into naturally occurring clays, for example, bentonite and kaolin. These materials for example clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic SSZ-32X of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

The mixture of SSZ-32X and binder can be formed into a wide variety of physical shapes. Generally speaking, the mixture can be in the form of a powder, a granule, or a molded product, such as an extrudate having a particle size sufficient to pass through a 2.5-mesh (Tyler) screen and be retained on a 48-mesh (Tyler) screen. In cases where the catalyst is molded, such as by extrusion with an organic binder, the mixture can be extruded before drying, or dried or partially dried and then extruded. The dried extrudate is then thermally treated using calcination procedures.

Calcination temperature may range from 199° C. to 595° C. Calcination may occur for periods of time ranging from 0.5 to 5 hours, or more, to produce a catalytically active product especially useful in hydrocarbon conversion processes.

The extrudate or particle may then be further loaded using a technique such as impregnation, with a Group VIII metal to enhance the hydrogenation function. It may be desirable to co-impregnate a modifying metal and Group VIII metal at once, as disclosed in U.S. Pat. No. 4,094,821. The Group VIII metal is preferably nickel, platinum, palladium or a combination thereof. After loading, the material can be calcined in air or inert gas at temperatures from 260° C. to 482° C.

EXAMPLES

The following examples are given to illustrate the present invention. It should be understood, however, that the invention is not to be limited to the specific conditions or details described in these examples.

Example 1

SSZ-32X Synthesis without Seeding

A reaction mixture for the synthesis of SSZ-32X was prepared by adding in sequence to deionized water the following: 48% aqueous KOH (M), 0.47M N,N'-diisopropylimidazolium hydroxide (Q), and alumina-coated silica sol 1SJ612 from Nalco (a version with 25 wt. % solids, a $SiO_2/Al_2O_3$ ratio of 35, and acetate as counter-ion). The molar ratios of the reaction mixture components were as follows:

| Components | Molar ratio |
| --- | --- |
| $SiO_2/Al_2O_3$ | 35.0 |
| $H_2O/SiO_2$ | 33.86 |
| $OH^-/SiO_2$ | 0.28 |
| $M/SiO_2$ | 0.24 |
| $Q/SiO_2$ | 0.04 |

The reaction mixture was heated to 170° C. over an 8 hour period and continuously stirred at 150 rpm for 135 hours at 170° C.

The pH and the apparent viscosity of the reaction mixture were monitored throughout the course of the reaction to determine the endpoint of the reaction.

The measured viscosity was determined using standard techniques at atmospheric pressure using a controlled stress rheometer equipped with a cone and plate geometry. Hot slurry samples were taken hourly from the autoclave during the zeolite synthesis process and carefully cooled through a heat exchanger to sub-boiling temperatures before being transferred to a closed container to minimize compositional changes from vapor losses. The sample in the closed container was actively cooled to about 25° C. The same sample may also be used for measuring the viscosity shear rate index and the pH.

Each cooled slurry sample was mixed or shaken prior to loading on the rheometer plate to ensure sample homogeneity, and the homogeneity of the sample was maintained after loading by subjecting the sample to a preliminary shear rate of 1000 $s^{-1}$ for at least 30 s in order to equilibrate the mixture at 25.0° C. Thereafter, each sample was subjected to shear rates of 100 $s^{-1}$, 200 $s^{-1}$, 500 $s^{-1}$, and 1000 $s^{-1}$ at 25.0° C., and the corresponding shear stress values needed to maintain those shear rates was recorded. The "measured viscosity" of each sample was then determined by dividing the measured shear stress by its corresponding shear rate.

The reaction endpoint was realized at a reaction time (at temperature) of about 135 hours.

The product was determined via powder XRD analysis to be SSZ-32X.

The reaction time for synthesis of SSZ-32X can be considerably shortened by the inclusion of seed crystals in the reaction mixture.

Example 2

SSZ-32X Synthesis with Seeding

A reaction mixture for the synthesis of SSZ-32X was prepared by adding the same components as in Example 1, except SSZ-32X seeds (3.5 wt. % based on the $SiO_2$ content) were included in the reaction mixture. The molar ratios of the reaction mixture components were as follows:

| Components | Molar Ratio |
| --- | --- |
| $SiO_2/Al_2O_3$ | 35.00 |
| $H_2O/SiO_2$ | 33.00 |
| $OH^-/SiO_2$ | 0.27 |
| $M/SiO_2$ | 0.21 |
| $Q/SiO_2$ | 0.06 |
| % Seed | 3.5% |

The reaction mixture was heated to 170° C. over an 8 hour period and continuously stirred at 150 rpm for about 65 hours at 170° C.

The pH and the apparent viscosity of the reaction mixture were monitored throughout the course of the reaction to determine the endpoint of the reaction. The reaction endpoint was realized at a reaction time (at temperature) of about 65 hours (see FIG. 1).

The zeolite sample was calcined to 595° C. and ion-exchanged to the ammonium form as described in U.S. Pat. No. 7,390,763. The sample was pre-heated to 450° C. to remove ammonia before the micropore volume was determined according to ASTM D4365. The product had a micropore volume of 0.034 cc/g. In contrast, standard SSZ-32 has a micropore volume of about 0.06 cc/g.

The product was confirmed via powder XRD analysis to be SSZ-32X.

Example 3

SSZ-32X Synthesis with Seeding

A reaction mixture for the synthesis of SSZ-32X was prepared by adding the same components as in Example 1, except SSZ-32X seeds (3.15 wt % based on the $SiO_2$ content) were included in the reaction mixture. Seed crystals were obtained from a prior SSZ-32X preparation, see, for example, Example 1. The molar ratios of the reaction mixture components were as follows:

| Components | Molar Ratio |
| --- | --- |
| $SiO_2/Al_2O_3$ | 35.00 |
| $H_2O/SiO_2$ | 31.00 |
| $OH^-/SiO_2$ | 0.27 |
| $M/SiO_2$ | 0.23 |

-continued

| Components | Molar Ratio |
|---|---|
| $Q/SiO_2$ | 0.04 |
| % Seed | 3.15% |

The reaction mixture was heated to 170° C. over an 8 hour period and continuously stirred at 150 rpm for about 65 hours at 170° C.

The pH and the apparent viscosity of the reaction mixture were monitored throughout the course of the reaction to determine the endpoint of the reaction. The reaction endpoint was realized at a reaction time (at temperature) of about 65 hours.

Analysis showed that the product had a $SiO_2/Al_2O_3$ molar ratio of 29. The product was confirmed by powder XRD analysis to be SSZ-32X. The product had a micropore volume of 0.035 cc/g as determined by ASTM D4365.

Example 4

SSZ-32X Synthesis Via a Two-Temperature Method

Another sample of SSZ-32X was synthesized by adding the same components as in Example 2, except that the reaction mixture was heated to a higher initial temperature for a period of time. Seed crystals were obtained from a prior SSZ-32X preparation, see, for example, Example 1. The molar ratios of the reaction mixture components were as follows:

| Components | Molar ratio |
|---|---|
| $SiO_2/Al_2O_3$ | 35.0 |
| $H_2O/SiO_2$ | 31.01 |
| $OH^-/SiO_2$ | 0.27 |
| $M/SiO_2$ | 0.23 |
| $Q/SiO_2$ | 0.04 |
| % Seed | 3.07 |

The reaction mixture was heated to 180° C. over an 8 hour period and continuously stirred at 150 rpm for 39 hours at 180° C.

The pH and the apparent viscosity of the reaction mixture were monitored throughout the course of the reaction to determine the endpoint of the reaction. The reaction mixture was then allowed to cool to 170° C. over 1 hour and then held at 170° C. for 7.8 hours at which time the reaction endpoint had been reached.

The product was determined via powder XRD analysis to be SSZ-32X.

In a concern that the products of the invention might be a mix of small crystals and considerable amorphous material, the product of Example 4 was analyzed by Transmission Electron Microscopy (TEM). Methods for TEM measurement are disclosed by A. W. Burton et al. in *Microporous Mesoporous Mater.* 117, 75-90, 2009. The microscopy work demonstrated that the product was quite uniformly small crystals of SSZ-32 (the product was SSZ-32X) with very little evidence of amorphous material. TEM measurements showed elongated crystals with an average length of about 16 nanometers and an average width of about 8 nanometers. By contrast, standard SSZ-32 crystals are elongate with an average length of about 170 nanometers.

Example 5

SSZ-32X Synthesis Via Concentrated Method

Another sample of SSZ-32X was synthesized by adding the same components as in Example 2 except that the deionized water was eliminated to provide a more concentrated reaction mixture. Seed crystals were obtained from a prior SSZ-32X preparation, see, for example, Example 1. The molar ratios of the reaction mixture components were as follows:

| Components | Molar ratio |
|---|---|
| $SiO_2/Al_2O_3$ | 35.0 |
| $H_2O/SiO_2$ | 17.00 |
| $OH^-/SiO_2$ | 0.25 |
| $M/SiO_2$ | 0.19 |
| $Q/SiO_2$ | 0.06 |
| % Seed | 3.52 |

The reaction mixture was heated to 170° C. over an 8 hour period and continuously stirred at 150 rpm for 65 hours at 170° C.

The pH and the apparent viscosity of the reaction mixture were monitored throughout the course of the reaction to determine the endpoint of the reaction. The reaction endpoint was realized at a reaction time (at temperature) of about 65 hours.

The product was determined via powder XRD analysis to be SSZ-32X. TEM measurements showed elongated crystals with an average length of about 17 nanometers and an average width of about 9 nanometers.

Example 6

Over-Crystallized SSZ-32X

A reaction mixture for the synthesis of SSZ-32X was prepared by adding the same components as in Example 1, except SSZ-32X seeds (3.15 wt. % based on the $SiO_2$ content) were included in the reaction mixture. The molar ratios of the reaction mixture components were as follows:

| Components | Molar Ratio |
|---|---|
| $SiO_2/Al_2O_3$ | 35.00 |
| $H_2O/SiO_2$ | 31.00 |
| $OH^-/SiO_2$ | 0.27 |
| $M/SiO_2$ | 0.23 |
| $Q/SiO_2$ | 0.04 |
| % Seed | 3.15% |

The reaction mixture was heated to 170° C. over an 8 hour period and continuously stirred at 150 rpm for about 90 hours at 170° C.

The pH and the apparent viscosity of the reaction mixture were monitored throughout the course of the reaction to determine the endpoint of the reaction. The reaction endpoint was realized at a reaction time (at temperature) of about 65 hours but the reaction was allowed to continue for 25 additional hours past the determined endpoint to provide over-crystallized SSZ-32X.

The product was determined via powder XRD analysis to be SSZ-32X. The product, as determined TEM measurements, showed elongated crystals with an average length of at least 43 nanometers and an average width of at least 23 nanometers. Particularly desirable SSZ-32X crystals typically have a crystallite size of no more than 40 nanometers.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one reference. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred herein are hereby incorporated by reference.

The invention claimed is:

1. A method of making a small crystal zeolite having a size of 10 to 40 nanometers, comprising
   (a) preparing a reaction mixture comprising:
      (i) at least one active source of an oxide of silicon;
      (ii) at least one active source of an oxide of aluminum;
      (iii) at least one active source of an alkali metal;
      (iv) hydroxide ions; and
      (v) an organic templating agent having the structure:

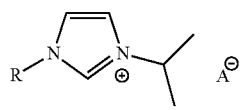

wherein R is a $C_1$ to $C_5$ alkyl group and $A^-$ is an anion which is not detrimental to the crystallization of the zeolite; and
   (b) maintaining the reaction mixture under conditions sufficient to form crystals of the zeolite having a size in the range of 10-40 nm wherein the zeolite is prepared in the absence of an amine component.

2. The method of claim 1, wherein the reaction mixture has a composition in terms of molar ratios falling within the ranges below:

| | |
|---|---|
| $SiO_2/Al_2O_3$ molar ratio | 20 < 72 |
| $H_2O/SiO_2$ molar ratio | 5-100 |
| $OH^-/SiO_2$ molar ratio | 0.07-1.0 |
| $M/SiO_2$ molar ratio | 0.02-0.5 |
| $Q/SiO_2$ molar ratio | 0.02-0.5 | wherein M is an alkali metal cation; and Q is the organic templating agent.

3. The method of claim 2, wherein the $H_2O/SiO_2$ molar ratio is 15 to 20.

4. The method of claim 1, wherein the at least one active source of an oxide of silicon and the at least one active source of an oxide of aluminum are derived from a common source.

5. The method of claim 1, wherein the organic templating agent is N-methyl-N'-isopropyl imidazolium hydroxide.

6. The method of claim 1, wherein the organic templating agent is N,N'-diisopropyl imidazolium hydroxide.

7. The method of claim 1, wherein the conditions sufficient to form crystals of the zeolite comprises heating the reaction mixture at a first temperature of from 175° C. to 190° C. for a period of from 12 to 48 hours; and reducing the first temperature of the reaction mixture to a second temperature of from 140° C. to 170° C. for a suitable period of time to form crystals of the zeolite.

8. The method of claim 1, wherein the zeolite has, in its as-synthesized form, a silica to alumina molar ratio of 20 to less than 40.

9. The method of claim 1, wherein the zeolite has a crystallite size of 12 to 20 nanometers.

10. The method according to claim 1, wherein the zeolite has, in its calcined form, an X-ray diffraction pattern substantially as shown in the following Table:

| 2-Theta (Degrees) | d-spacing (Angstroms) | Relative Absolute Intensity (%) |
|---|---|---|
| 8.1 | 10.88 | M |
| 8.9 | 9.88 | W |
| 11.4 | 7.78 | M |
| 16.1 | 5.51 | W |
| 19.8 | 4.49 | VS |
| 21.0 | 4.22 | VS |
| 23.0 | 3.86 | VS |
| 24.2 | 3.67 | VS |
| 25.4 | 3.50 | S |
| 26.1 | 3.41 | S |
| 31.6 | 2.83 | W |
| 35.6 | 2.52 | M |
| 36.7 | 2.45 | W |
| 44.8 | 2.02 | W. |

11. The method of claim 1 further comprising monitoring at least one viscometric parameter of the reaction mixture; and determining an endpoint.

12. The method of claim 11, the at least one viscometric parameter of the reaction mixture is selected from the group consisting of viscosity shear rate index, measured viscosity, or combination thereof.

13. The method of claim 11, wherein the endpoint is determined based on a change in measured viscosity of the reaction mixture, a change in pH of the reaction mixture, or combination thereof.

* * * * *